April 23, 1963
H. A. ALTMAN
3,087,048
RE-EDGING MACHINE
Filed Feb. 2, 1961
2 Sheets-Sheet 1
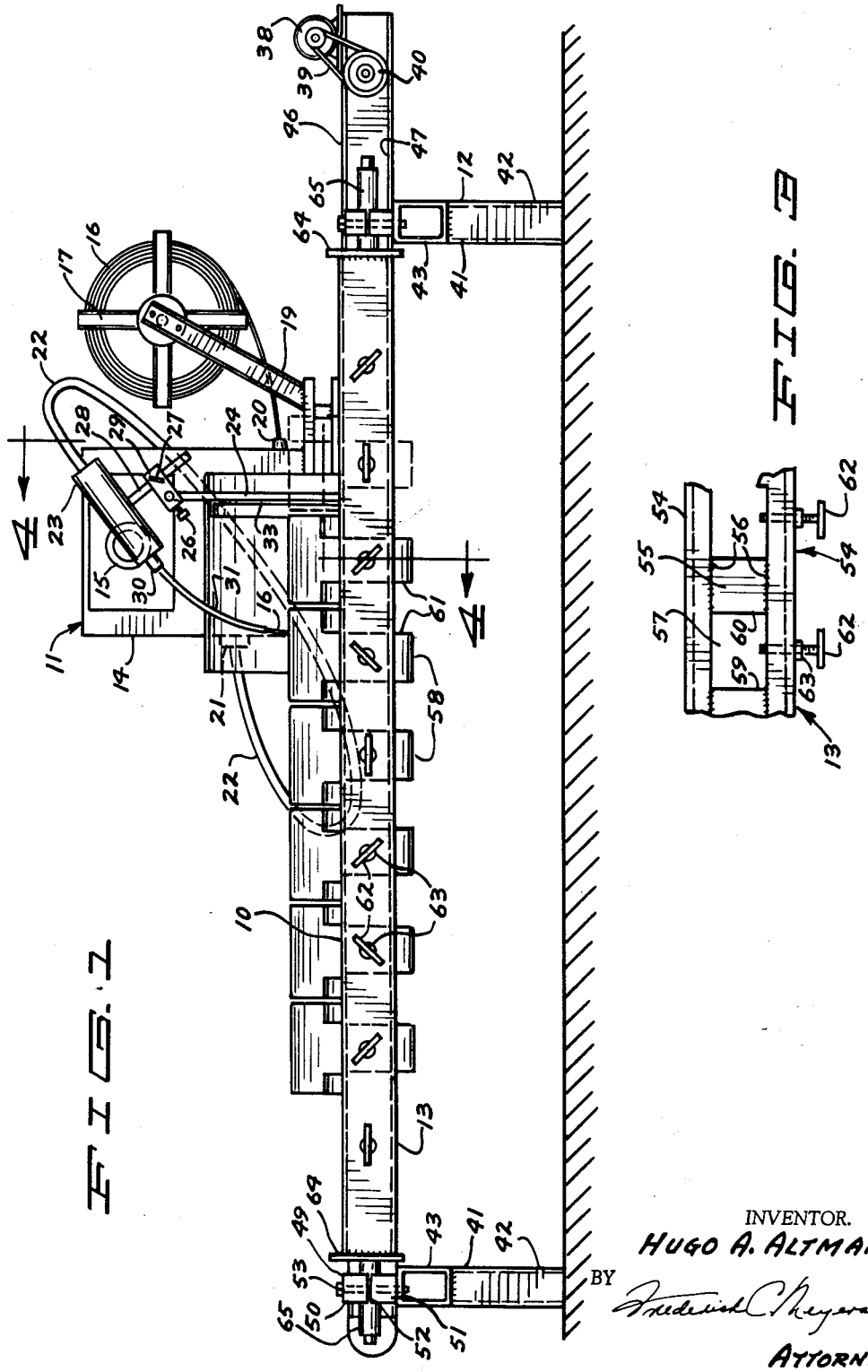
INVENTOR.
HUGO A. ALTMAN
BY
Frederick C. Meyers
ATTORNEY

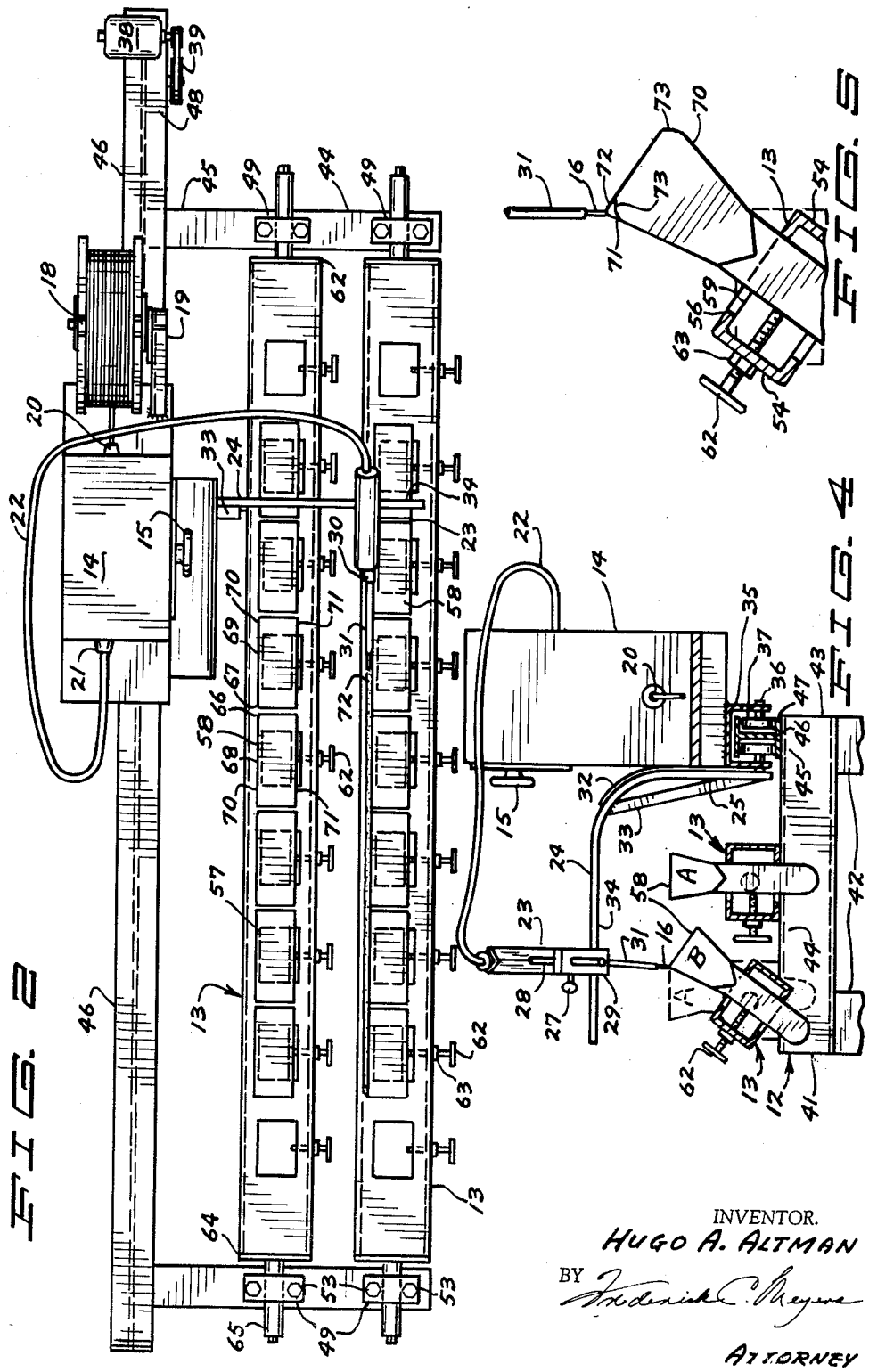

United States Patent Office 3,087,048
Patented Apr. 23, 1963

3,087,048
RE-EDGING MACHINE
Hugo A. Altman, 2419 Garfield St. NE.,
Minneapolis, Minn.
Filed Feb. 2, 1961, Ser. No. 86,760
4 Claims. (Cl. 219—125)

This invention relates to welding and pertains more particularly to a machine for re-edging worn hammermill hammers or the like, with an overlay of deposited hardweld metal.

The application of metallic overlays or facings to worn edges of hammermill hammers used in the pulverizing of limestone or other ore is, of course, not new. Previous techniques, however, have incorporated time consuming operation, much of which is manual in character.

In prior methods of applying overlay to hammers, the hammers were first removed from the hammermill after which each individual hammer was separately reconstructed with the overlay material through arc-welding procedure. Considering the size and weight of the hammers involved, a considerable amount of time and effort was, of necessity, expended in merely positioning and repositioning each individual hammer preparatory to its re-edging reconstruction. Any variation in position of the tool, rate of travel of the welding head, rate of feed of the welding rod, amperage applied, and so forth could result in insufficient facing, waste of material, or improper application.

Through the machine herein disclosed, I have devised a means for substantially eliminating the above now existing drawbacks experienced during reconstructing, or re-edging, tools such as excavating teeth and hammermill hammers, and accordingly:

An important object of this invention is to provide a re-edging machine whereby several worn tools may be rapidly re-edged consecutively and with close control through the incorporation of semi-automatic welding equipment.

Another object of this invention is to provide a re-edging machine whereby the workpieces may be positioned with respect to the re-edging equipment such that an optimum diffusion and depositing angle is maintained.

A further object of this invention is to provide a re-edging machine as described above which stresses simplicity and economy of construction and is adaptable to the rebuilding of a number of types of tools subject to edge wear.

These and other objects and advantages of my invention will more fully appear from the following description, made in connection with the accompanying drawings, wherein like reference characters refer to the same or similar parts throughout the several views and in which:

FIGURE 1 is a side elevational view of my re-edging device in operation with hammermill hammers positioned therein;

FIGURE 2 is a top view of FIGURE 1;

FIGURE 3 is an enlarged segmental view of FIGURE 2 showing detailed construction technique of a jig;

FIGURE 4 is a cross sectional view of FIGURE 1 taken at 4—4 and having one of the jigs rotated to the re-edging position; and FIGURE 5 is an enlarged segmental view of the hammermill hammer and immediately associated parts as shown in FIGURE 4.

Referring now more particularly to FIGURE 1, I show my re-edging device referred to generally as 10 consisting of three principal parts, the welding system 11, the frame 12 and jigs 13.

Referring to the welding system 11, I provide a conventional semi-automatic welding supply 14 contained in a single enclosure having a control knob 15 for adjusting the welding amperage. Also included in my welding system is the weld wire 16 supplied on spool 17. Spool 17 in turn is rotatably journaled on a spool shaft 18, as seen in FIGURE 2, which shaft in turn is rigidly secured to brace 19.

As is readily understood by those skilled in the art of welding, the weld wire 16 enters the conventional semi-automatic welding supply 14 at inlet 20 and is thereafter speed controlled and fed by the welding supply 14 itself, such speed of course being dependent upon the welding requirements. The wire is then ejected through outlet 21 and into flexible wire conduit 22. Flexible wire conduit 22 in turn connects at its outer end to a welding gun 23 to which the weld wire 16 is supplied.

As seen in FIGURE 1, welding gun 23 is mounted on support arm 24 (see FIGURE 4) which is simply a rod having a 90 degree bend, the lower portion 25 of which is fixed to the welding supply 14 box.

Referring again to FIGURE 1, the welding gun 23 may be repositioned either vertically, horizontally or angularly by means of thumb screws 26 and 27, and standard 28 held by gun clamp 29.

Protruding from the feeding end of the welding gun 23 is an orifice 30 having tubular weld wire guide 31 threadably engaged therein. The purpose of tubular weld wire guide 31, of course, is to control the angle of attack of weld wire 16 as it approaches the hammer or other article being welded.

Referring again to FIGURE 4 and the support arm 24, I provide a reinforcement backing 32 and a structural brace 33 to hold the outwardly extending portion 34 of support arm 24 rigid. As may be seen in FIGURE 4, the outwardly extending portion 34 extends the width of the frame 12 for purposes which will become apparent.

As also may be seen in FIGURE 4, I mount my welding supply 14 on an inverted U-beam 35 which in turn has pivotally mounted to axles 36, wheels 37.

Referring now to FIGURES 1 and 2, I provide a motor 38 and belt 39, which drive pulley 40 for providing longitudinal movement of the welding supply 14 and associated mechanisms along a track.

In description of the frame 12, with reference to FIGURES 1, 2 and 4, I provide a pair of end leg mountings 41 each which in turn consists of a pair of vertically positioned legs 42 fixed to the cross member 43. It is understood, of course, that the end leg mountings 41 are of heavy-duty construction and materials so as to provide the necessary support of the entire re-edging device.

As seen in FIGURE 2, the end leg mountings 41 have forwardly extending open portions or bed means 44 across which the jigs 13 are positioned as will be explained subsequently. Across the rear portions 45 of end leg mountings 41 is a single I-beam 46 which is fixedly secured to the cross member 43. As seen in FIGURE 4, the lower cross 47 of the I-beam 46 provides a track on which wheels 37 of welding supply 14 ride. I-beam 46 also provides the mounting surface for motor 38 on the extended portion 48 thereof. I prefer to use an I-beam of substantial cross sectional area to withstand any downward deflection as it travels over the length of the I-beam. The importance of maintaining the welding system (which includes the welding gun 23) in a single plane will become obvious subsequently in the explanation of operation.

As seen in FIGURE 1, the two cross members 43 of end leg mountings 41 are each provided with a pair of clamping brackets 49, having an upper portion 50 (see FIGURE 2) and a lower portion 51 having open space 52 therebetween. Clamping brackets 49 are secured to the cross member 43 by means of clamping bolts 53.

Referring again to FIGURE 2, I provide my re-edging device with a pair of jigs 13 extending across and between open portions 44 of the end leg mountings 41. I find that each of the jig members 13 may be most easily constructed by using two C-beams 54 (see FIGURES 3 and 5) (with their open portions facing each other in parallel relation) secured to each other by a plurality of securing plates 55 welded or otherwise fixed across the leg portions of the C-beams 54 at joints 56. It will be noticed that the open portions between the adjacent securing plates 55 provide saddle portions 57 for receiving the hammermill hammers 58. Edges 59 and 60 of adjacent securing plates 55 are separated by a distance equal to the width of the lower portions 61 of hammermill hammers 58 as seen in FIGURE 1.

Threadably engaged into one side of each of the C-beams 54 are jig clamps 62, each also being positioned centrally with respect to the saddle portions 57. Secured to the outside edge of the jig 13 is a collar 63 which is threaded internally to provide additional bearing surface for the jig clamp 62.

Secured to the ends of C-beams 54, and forming a part of the jigs, are end plates 64 to which is fixed a short shaft 65 that in turn is journaled through clamping bracket 49.

In the use and operation of my re-edging device, the hammermill hammers, after being removed from the hammermill, are positioned as shown in FIGURES 1 and 2 in the saddles 57 of jigs 13. When so positioned, and with regard to the width of plates 55, the adjacent edges 66 and 67 of the adjacent hammers 68 and 69 are positioned approximately one-eighth of an inch apart. Once the jig is filled with hammers 58, the jig clamps 62 are tightened whereby to force the hammers against the opposite C-beams 54. It will now be noted that, assuming all the hammers to have equal length, that all the corresponding edges 70 and 71 of adjacent hammers are substantially aligned.

Referring now to FIGURE 4, the jigs are rotated about their shafts 65 from position "A" to position "B" after which clamping bolts 53 are tightened so as to draw the upper portion 50 of clamping bracket 49 down upon the shaft 65 thereby frictionally holding the shaft and jig from any subsequent rotation.

After the hammers are positioned preparatory to the welding or re-edging process, the welding gun 23 is transversely positioned on support arm 24 by means of thumb screw 26 at which time the welding gun 23 is also properly angled with respect to the hammer edges 71. Now that the welding gun 23 is properly positioned, the welding supply is propelled along the track 46 by motor 38 until the welding wire 16 comes in contact with the first hammer positioned in the jig whereafter the semi-automatic welding supply 14 is put in operation.

Once the above procedure has been completed, the welding supply will traverse the length of the jigs thereby welding a continuous overlay 72 on all of the hammers as shown in FIGURE 5 thus rebuilding the worn corners 73 to the desired height. When the re-edging or overlaying process is completed and the overlay 72 is allowed to cool, I have found that there subsequently is a natural cracking process of the overlay 72 which takes place between adjacent hammers. This I find is an incidence directly related to the one-eighth inch distance between adjacent hammers.

Once the hammers are re-edged on the first corner, the jig may be rotated until the other edge is properly positioned. Then the welding gun is repositioned properly and the re-edging process again is set in operation.

Once the hammers have cooled, a quick and simple grinding smooth of the jagged cracked edge of the overlay will leave the hammers in the desired, newly re-edged condition and may again be installed in the hammermill.

Through the above, it is seen that I have devised a means for re-edging several hammers for a hammermill in a single re-edging process and have eliminated the extra effort and time concerned with a similar re-edging process carried on with individual hammers one at a time.

It will, of course, be understood that various changes may be made in the form, details, arrangements and proportions of the parts without departing from the scope of my invention as set forth in the appended claims.

What is claimed is:

1. In combination, a frame, said frame providing a bed portion and a track portion, an electric welding means movably mounted on said track, and a plurality of jigs positioned across said frame bed and in substantially parallel relation to said track, each of said jigs further having a plurality of saddles for receiving and holding edge-worn tools such that their worn edges are substantially aligned whereby said welding means may be caused to consecutively build a hard weld edge upon a plurality of edge-worn tools held in a jig.

2. In a welding system for re-edging worn tools such as hammermill hammers, a frame, said frame providing a bed portion and a track portion, a continuous self feeding electric welding means movably mounted on said track, the welding portions thereof overlying said bed portion, said welding portion further being adapted for transverse and longitudinal movement, and a plurality of jigs lying across said frame bed and in substantially parallel relation to said track, each of said jigs comprising a pair of C-beams facing each other in spaced and parallel relation and securing plates welded thereacross whereby the securing plates provide a plurality of individual saddles therebetweeen for receiving and holding said tools with their worn edges substantially aligned whereby said welding means may be caused to consecutively re-edge the tools so held in a jig.

3. In a worn tool re-edging combination, a frame having a bed portion and a track portion, an automatic welding means movably mounted on said track, and a means for moving said welding means longitudinally of said bed, said welding means having a welding gun overyling said bed and adjustably movable transversely thereover, a plurality of jigs mounted across said bed and having their ends rotatably journaled in said frame, and means adapted to mount a plurality of worn tools in each jig with their worn edges substantially in alignment whereby said jig and said worn tools may be rotated to a predetermined position whereby said tools will be automatically and successively re-edged at the apexes thereof by said welding means during longitudinal travel thereof.

4. In an electric welding combination for re-edging tools such as hammermill hammers, a frame having a bed portion and a track portion, an electric welding means movably mounted on said track, means for automatically moving said welding means longitudinally of said bed, said welding means having a welding gun overlying said bed and adjustably movable transversely thereover, a plurality of jigs mounted across said bed in parallel relation to said track, said jigs having their ends rotatably journaled in said frame and adapted to receive a plurality of worn tools with the worn edges thereof lying in substantial alignment whereby said jigs may be rotated for positioning said tool edges in preparation to consecutive re-edging welding.

References Cited in the file of this patent
UNITED STATES PATENTS

| | | |
|---|---|---|
| 2,145,651 | Funk | Jan. 31, 1939 |
| 2,174,906 | Wagner | Oct. 3, 1939 |
| 2,288,032 | Smith | June 30, 1942 |
| 2,862,101 | Klinke | Nov. 25, 1958 |